(12) United States Patent
He

(10) Patent No.: US 8,276,821 B2
(45) Date of Patent: Oct. 2, 2012

(54) PORTABLE DATA COLLECTOR

(75) Inventor: Deng-Shiang He, Kaohsiung (TW)

(73) Assignee: Sui-Chung Lin, Kaohsiung (TW)

( * ) Notice: Subject to any disclaimer, the term of this patent is extended or adjusted under 35 U.S.C. 154(b) by 289 days.

(21) Appl. No.: 12/582,279

(22) Filed: Oct. 20, 2009

(65) Prior Publication Data
US 2011/0089243 A1    Apr. 21, 2011

(30) Foreign Application Priority Data
Sep. 18, 2009    (TW) .............................. 98217187 U

(51) Int. Cl.
*G06K 5/04*    (2006.01)
(52) U.S. Cl. .............................. 235/462.48; 235/462.45
(58) Field of Classification Search ............. 235/462.45, 235/462.48
See application file for complete search history.

(56) References Cited

U.S. PATENT DOCUMENTS

| 5,736,726 | A  | * | 4/1998 | VanHorn et al. | 235/472.02 |
| 7,651,029 | B1 | * | 1/2010 | Mangaroo et al. | 235/462.45 |
| 2008/0024435 | A1 | * | 1/2008 | Dohta | 345/156 |
| 2010/0025473 | A1 | * | 2/2010 | Boyd | 235/472.01 |

* cited by examiner

*Primary Examiner* — Thien M Le
*Assistant Examiner* — Sonji Johnson
(74) *Attorney, Agent, or Firm* — Chun-Ming Shih; HDLS IPR Services

(57) ABSTRACT

A portable data collector having scan buttons pressed by forefinger to input merchandise information and scan merchandise barcode includes a shell body having a top face and a bottom face corresponding to the top face; a circuit board installed in the shell body; a plurality of input buttons arranged on the top face for actuating the scan component to generate scan light to read barcode and electrically connected to the circuit board; a display screen also arranged on the top face of the shell body and electrically connected to the circuit board; a scan component additionally arranged in the shell body and electrically connected to the circuit board; and a scan button shown as a trigger shape and arranged on the bottom face of the shell body to be electrically connected to the circuit board; thereby, when the scan button is pushed by forefinger, the scan component is actuated.

5 Claims, 7 Drawing Sheets

PORTABLE DATA COLLECTOR

BACKGROUND OF THE INVENTION

1. Field of the Invention

The present invention in general relates to a data collector, in particular, to a portable data collector.

2. Description of Prior Art

Most products in the market are printed barcodes on their package surfaces or outer boxes. A barcode of product is encoded based upon a specific encoding principle. So, each product barcode represents the merchandise's information, such as, name, goods number, price and quantity. Through the application of barcode, an automatic merchandise management method can be achieved accurately, quickly and conveniently.

Furthermore, common merchandise has to be inventoried and checked to control its shipping-in and -out situations. The inventory method is usually to adopt a handheld data collector, on the top face of which a plurality of input buttons are arranged, and on top face or lateral face of which a scan button is arranged. Through pushing the input buttons to input barcode of merchandise, or through pushing the scan button with thumb to scan the barcode of merchandise, the barcode representing the merchandise information can be input into the data collector.

However, during using the data collector, a hand usually has to hold the data collector and to push the scan button frequently and continuously with thumb, when a large amount of merchandises are inventoried and checked. However, this kind of action sometimes makes the user's muscle of palm or thumb generate great pain, hindering the normal operation of job and causing a working hurt.

Accordingly, after a substantially devoted study, in cooperation with the application of relative academic principles, the inventor has finally proposed the present invention designed reasonably to possess the capability to improve the drawbacks of the prior arts significantly.

SUMMARY OF THE INVENTION

Therefore, in order to solve aforementioned problems, the invention is mainly to provide a portable data collector, on the bottom face of which a scan button shown as a trigger shape is arranged. When the scan button is pushed by forefinger, the scanner is actuated to thereby collect a large amount of merchandise information.

Secondly, the invention is to provide a portable data collector for inputting merchandise information and scanning merchandise barcode. The data collector includes a shell body, a circuit board installed in the shell body, a plurality of input buttons electrically connected to the circuit board, a display screen electrically connected to the circuit board, a scan component electrically connected to the circuit board and a scan button electrically connected to the circuit board. The shell body has a top face and a bottom face corresponding to the top face. The input buttons are arranged on the top face of the shell body. The display screen is arranged on the top face of the shell body. The scan component is arranged in the shell body. The scan button shown as a trigger shape is arranged on the bottom face of the shell body. Thereby, when the scan button is pushed by forefinger, the scan component is actuated.

Thirdly, the invention is to provide a portable data collector for inputting merchandise information and scanning merchandise barcode. The data collector includes a shell body, a circuit board installed in the shell body, a plurality of input buttons electrically connected to the circuit board, a display screen electrically connected to the circuit board, a scan component electrically connected to the circuit board and a scan button electrically connected to the circuit board and a grip. The shell body has a top face and a bottom face corresponding to the top face. The input buttons are arranged on the top face of the shell body. The display screen is arranged on the top face of the shell body. The scan component is arranged in the shell body. The scan button shown as a trigger shape is arranged on the bottom face of the shell body. The grip is connected to the bottom face of the shell body and arranged a trigger at a place corresponding to the scan button, pushing the trigger, which will be abutted against the scan button. Thereby, when the scan button is pushed by forefinger, the scan component is actuated.

Compared with prior arts, the invention is additionally arranged a scan button on the bottom face of the shell body of the portable data collector, such that it is convenient for forefinger to press it to scan merchandise barcode. Besides, the bottom face of the shell body can be combined with a grip, such that it is convenient for a user to grip it and then press the scan button with his forefinger. Since the use of the data collector according to the invention fulfills the ergonomics, when a large amount of merchandise is inventoried or checked, it can avoid an occurrence of working accidence, thereby, enhancing the practicability and convenience of the invention.

BRIEF DESCRIPTION OF DRAWING

The features of the invention believed to be novel are set forth with particularity in the appended claims. The invention itself, however, may be best understood by reference to the following detailed description, which describes a number of embodiments of the invention, taken in conjunction with the accompanying drawings, in which:

DETAILED DESCRIPTION OF THE INVENTION

In cooperation with attached drawings, the technical contents and detailed description of the present invention are described thereinafter according to a number of embodiments, not used to limit its executing scope. Any equivalent variation and modification made according to appended claims is all covered by the claims claimed by the present invention.

Figure 1:
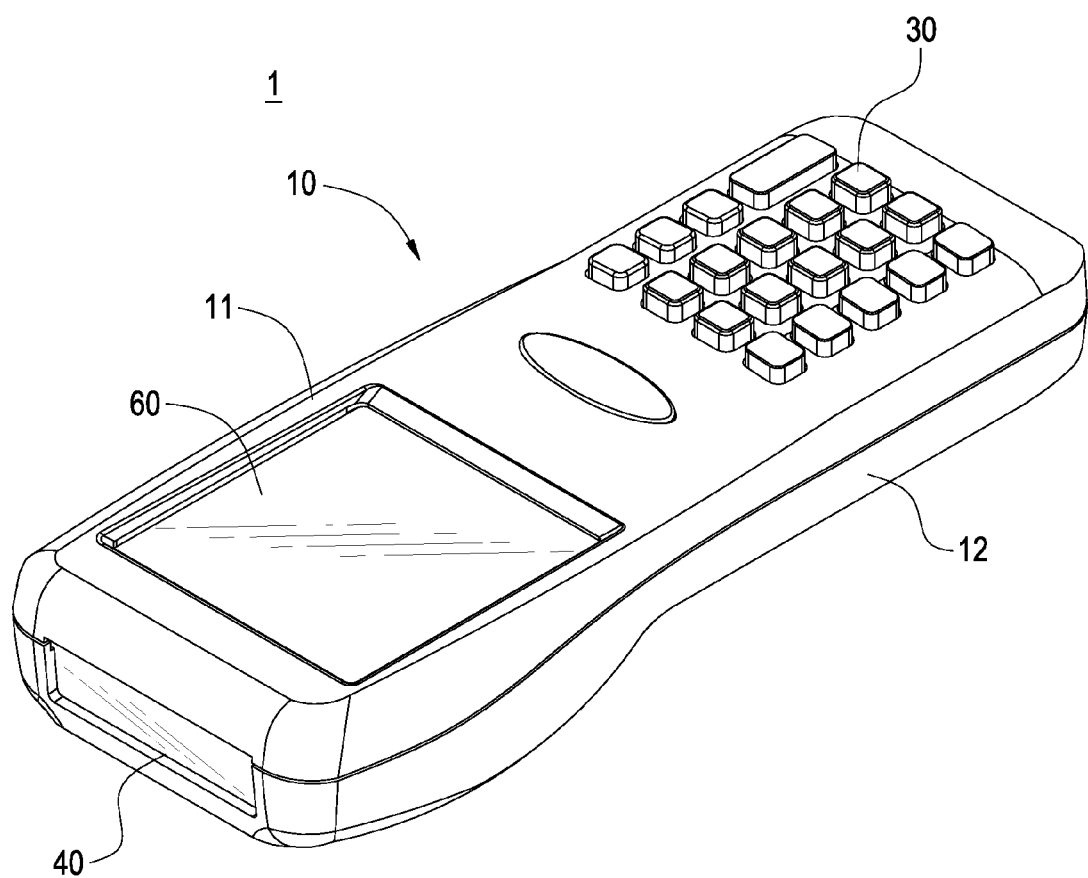
FIG. 1 is a perspective outer view from one side of a portable data collector according to the present invention.
Figure 2:
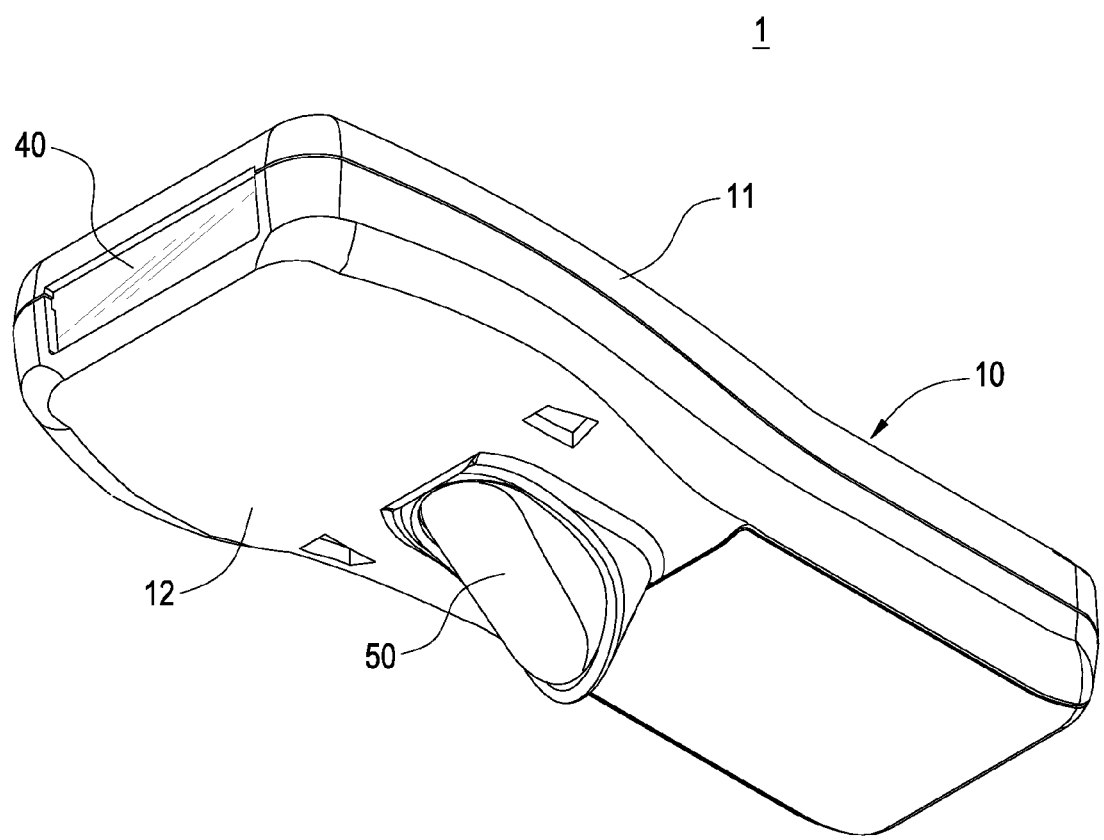
FIG. 2 is a perspective outer view from another side of a portable data collector according to the present invention.
Figure 3:
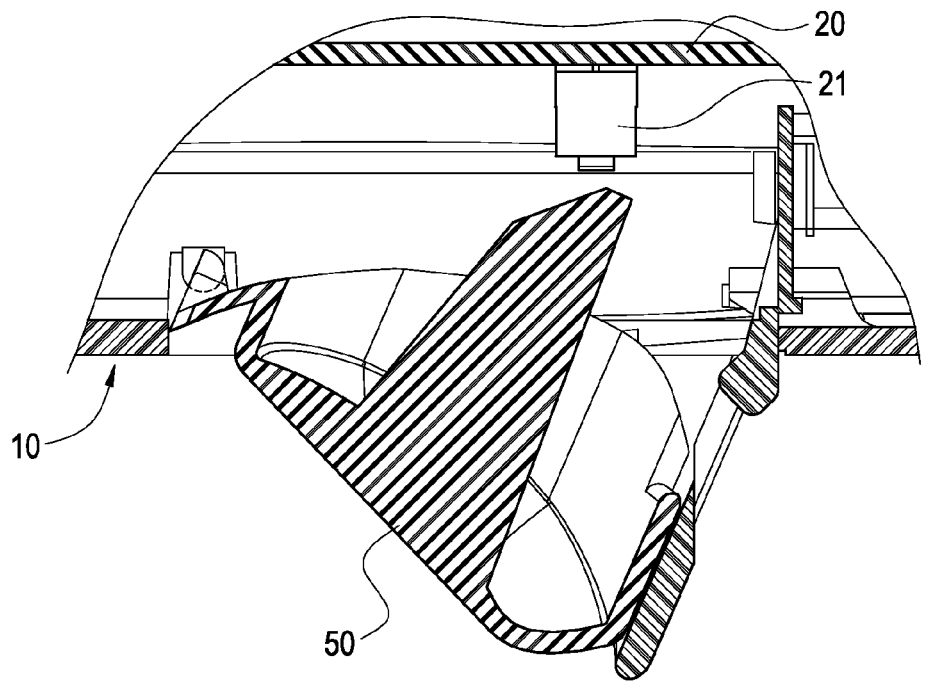
FIG. 3 is a partially cross-sectional view of a portable data collector according to the present invention.

Please refer to FIG. 1 through FIG. 3, which show a perspective outer view from one side of a portable data collector according to the present invention, a perspective outer view from another side and a partially cross-sectional view. The data collector 1 is for inputting merchandise information and scanning merchandise barcode and includes a shell body 10, a circuit board 20, a plurality of input buttons 30, a scan component 40, a scan button 50 and a display screen 60.

The shell body 10 has a top face 11 and a bottom face 12 corresponding to the top face 11. The circuit board 20 is arranged in the shell body 10. On the top face 11 and bottom face 12 of the shell body 10, a plurality of input buttons 30 and a scan button 50 shown as a trigger shape are respectively arranged, both of which are electrically connected to the circuit board 20.

Moreover, the scan component 40 is arranged at front of the shell body 10, while the scan button 50 is arranged on the bottom face 12 of the shell body 10 and electrically connected to the circuit board 20 such that, when the scan component 40 is scanning barcode, or when the input buttons are being pressed, the correspondingly generated signals will be shown on the display screen 60.

Figure 4:
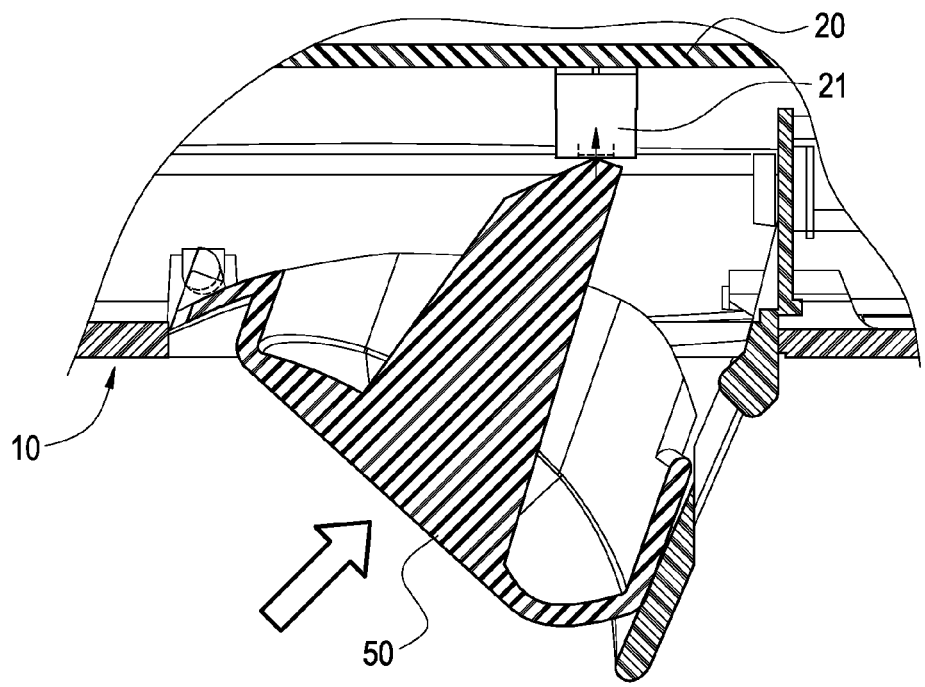
FIG. 4 is a using illustration of a portable data collector according to the present invention.

Please refer to FIG. 4 simultaneously, which shows a using illustration of the portable data collector of the invention. In this preferable embodiment, the circuit board 20 is arranged a sensor 21, which can be touched to actuate the scan component 40. Therefore, in order to scan the barcode of merchandise, when a user is holding the data collector 1, the scan button 50 is pressed by the forefinger, making the scan button 50 abutted against the sensor 21, through the circuit board 20, actuating the scan component 40 to process a scanning job on the barcode of the merchandise.

Figure 5:
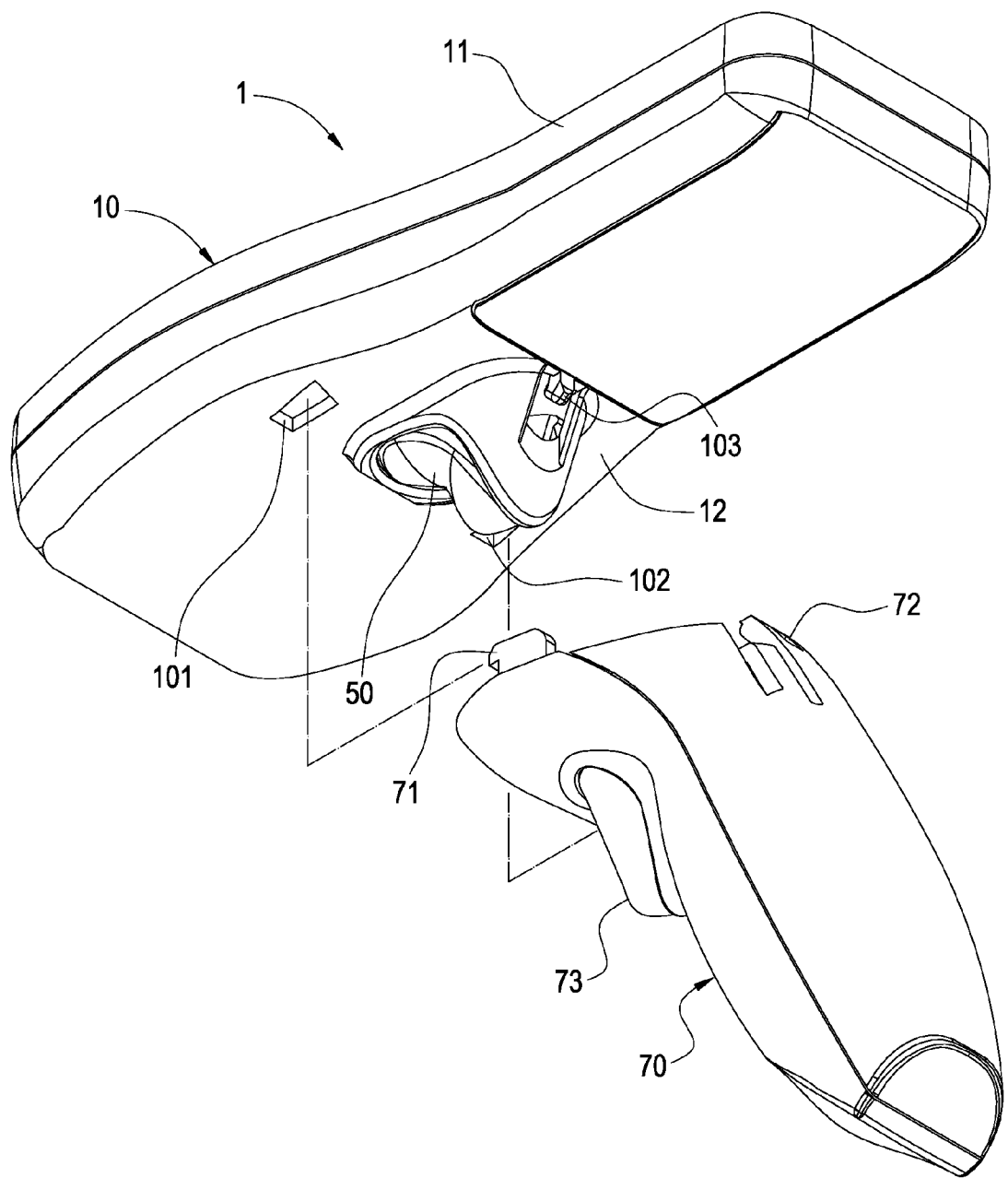
FIG. 5 is a perspective explosive view showing a grip to be combined with a portable data collector according to the present invention.
Figure 6:
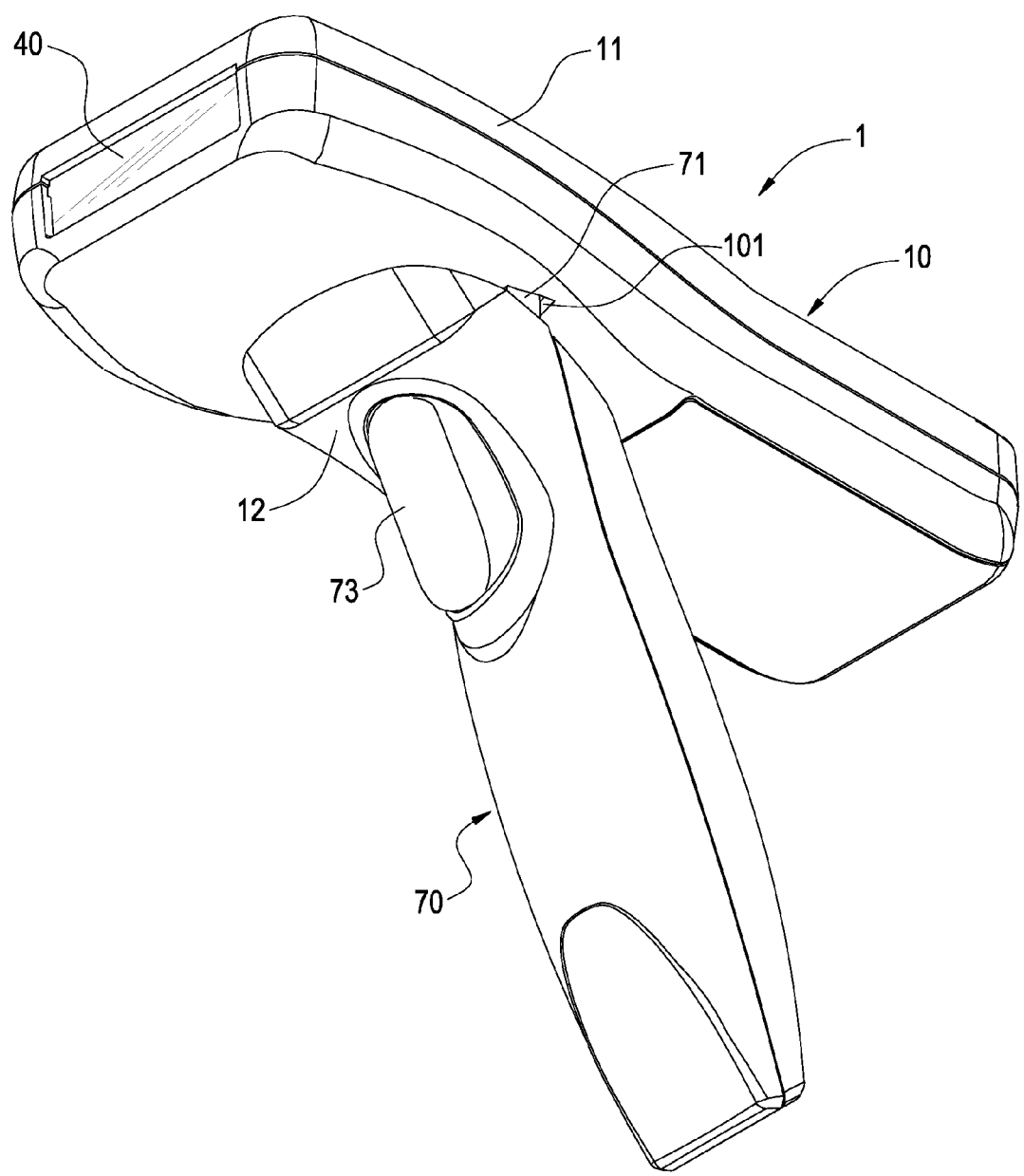
FIG. 6 is a perspective outer view showing a grip combined with a portable data collector according to the present invention.

Please refer to FIG. 5 and FIG. 6, which respectively show a perspective explosive view and a perspective outer view of a combination of a grip and a portable data collector of the invention. The data collector 1 further includes a grip 70, which is combined onto the bottom face 12 of the shell body 10. In this preferable embodiment, the combination manner between the shell body 10 and the grip 70 is described thereinafter. First of all, two first connection portions 101, 102 are arranged on the bottom face 12 of the shell body 12. Correspondingly, a second connection portion 71 is arranged on the grip 70. In addition, a first positioning portion 103 is arranged on the bottom face 12 of the shell body 10. Correspondingly, a second positioning portion 72 is arranged on the grip 70. When the first connection portions 101, 102 and the second connection portion 71 are inter-buckled together, and when the first positioning portion 103 is positioned in the second positioning portion 72, the grip 70 thereby can be fixed onto the bottom face 12 of the data collector 1. In this case, the first connection portions 101, 102 are a hook slot, the second connection portion 71 is a wedge hook correspondingly, the first positioning portion 103 is a tenon, and the second positioning portion 72 is a buckle slot.

Figure 7:
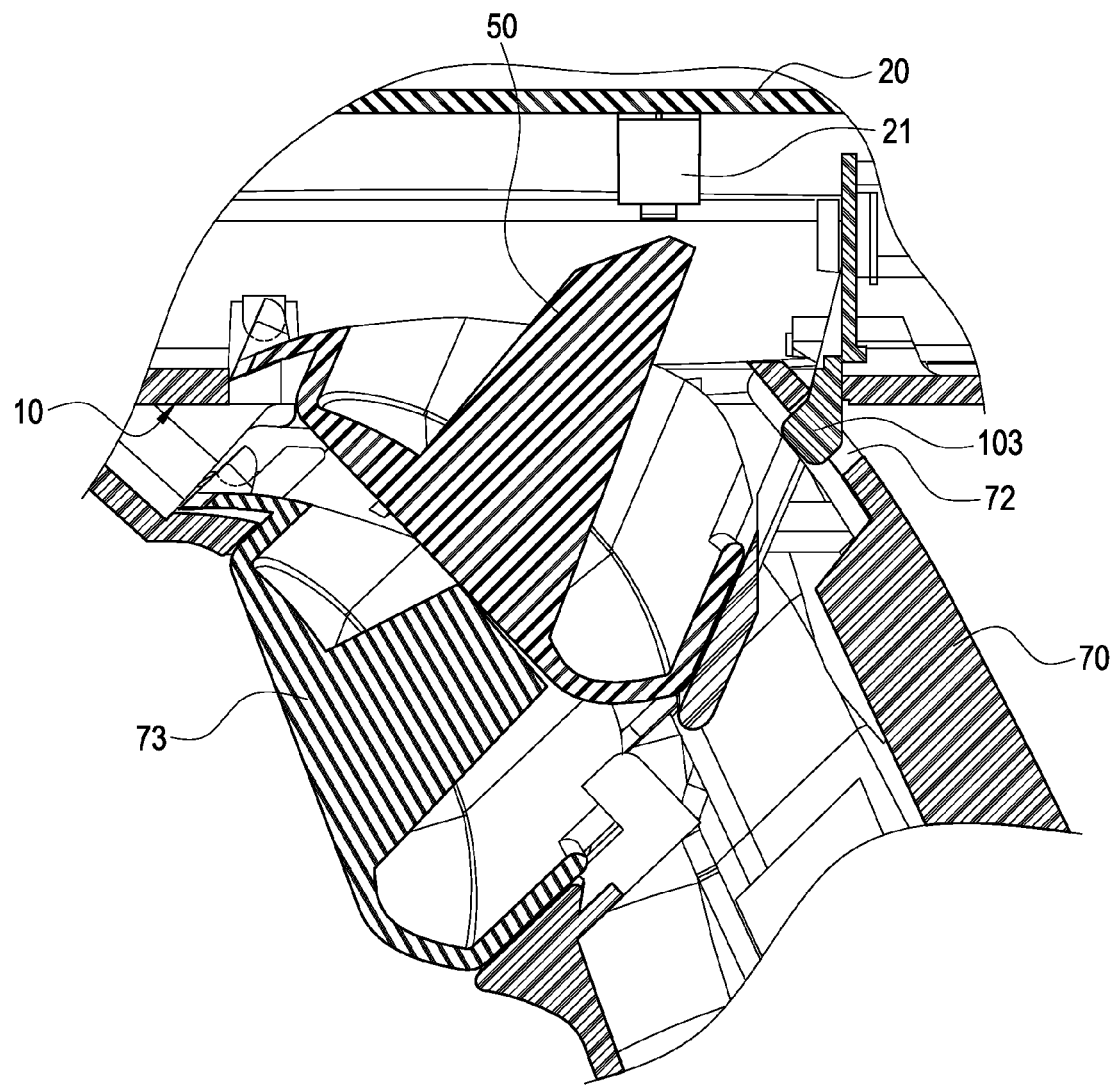
FIG. 7 is a partially cross-sectional view showing a combination of a grip and a portable data collector according to the present invention.
Figure 8:
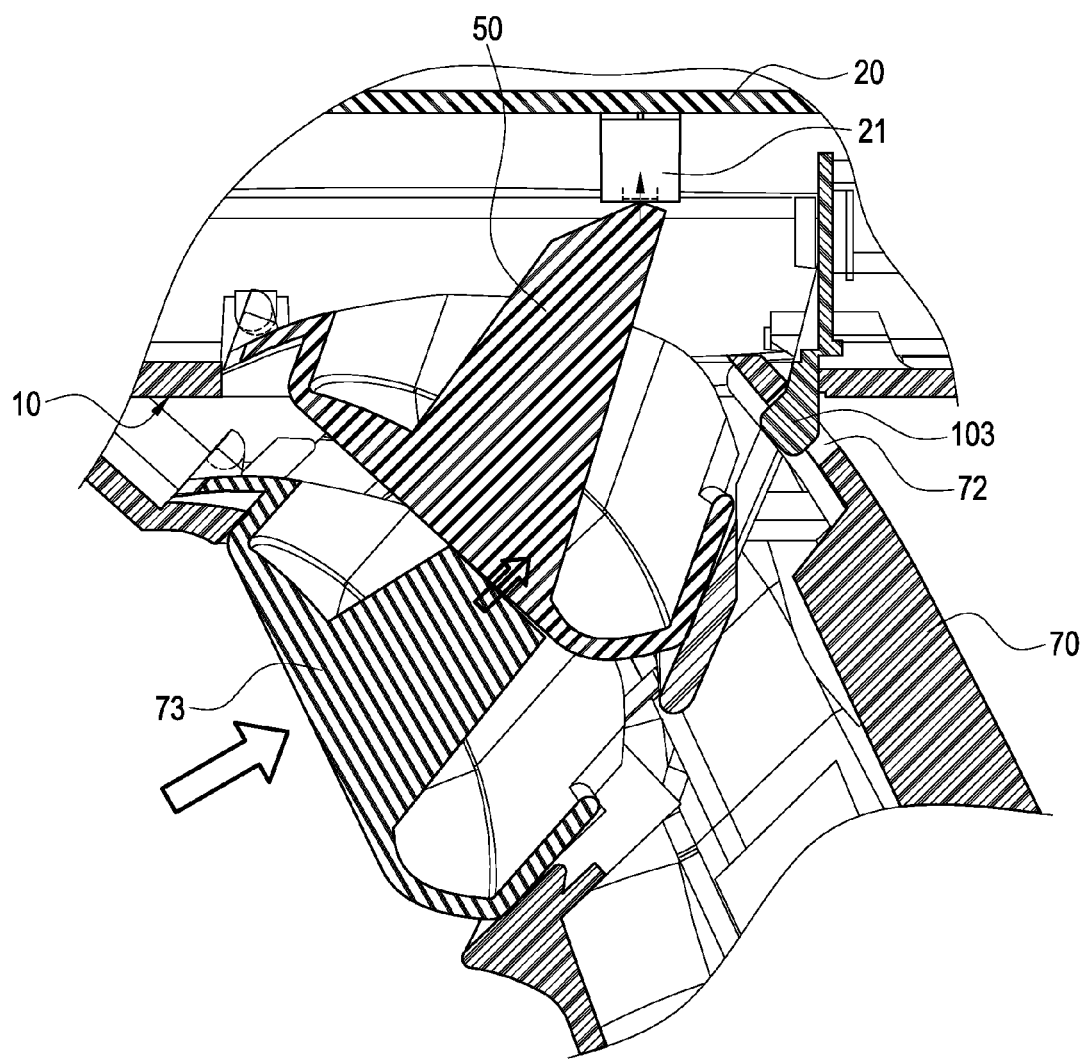
FIG. 8 is an illustration showing the usage of a combination of a grip and a portable data collector according to the present invention.

Please refer to FIG. 7 and FIG. 8 continuously, which respectively show a partially cross-sectional view of a combination of a grip and a portable data collector of the invention. In this case, a trigger 73 is arranged at the grip 70 at a place corresponding to the scan button 50. When the trigger 73 is abutted against an outside of the scan button 50, the scan button 50 is pressed. When the scan button 50 is pressed, the sensor 21 is touched. The grip 70 is combined onto the bottom face 12 of the shell body 10 to form a data collector 1 formed as a gun shape. User can hold the grip 70 with hand and press the trigger 73 with forefinger to process a job of scanning the barcode of merchandise.

Accordingly, through the constitution of aforementioned assemblies, a portable data collector according to the invention is thus obtained.

Summarizing aforementioned description, the portable data collector is an indispensably instrument for inventorying and checking merchandise indeed, which may positively reach the expected usage objective for solving the drawbacks of the prior arts, and which extremely possesses the innovation and progressiveness to completely fulfill the applying merits of a new type patent, according to which the invention is thereby applied. Please examine the application carefully and grant it as a formal patent for protecting the rights of the inventor.

However, the aforementioned description is only a number of preferable embodiments according to the present invention, not used to limit the patent scope of the invention, so equivalently structural variation made to the contents of the present invention, for example, description and drawings, is all covered by the claims claimed thereinafter.

What is claimed is:

1. A portable data collector having scan buttons pressed by forefinger to input merchandise information and scan merchandise barcode, including:
    a shell body, which has a top face and a bottom face corresponding to the top face;
    a circuit board, which is installed in the shell body;
    a plurality of input buttons, which are arranged on the top face of the shell body, and which are electrically connected to the circuit board;
    a display screen, which is arranged on the top face of the shell body and electrically connected to the circuit board;
    a scan component, which is arranged in the shell body and electrically connected to the circuit board;
    a scan button, which is shown as a trigger shape and protruded out from the bottom face of the shell body; and
    a grip, which is detachably connected to the bottom face of the shell body and arranged a trigger at a place abutted against the scan button;
    wherein the circuit board is arranged a sensor, which can actuate the scan component when the sensor is touched, and
    thereby, when the grip is dismounted from the shell body, the scan component is actuated by holding the bottom face, pushing the scan button to directly touch the sensor by an index finger and operating the input buttons by a thumb, and alternatively when the grip is mounted to the shell body, the scan component is actuated by pushing the trigger to press on the scan button so that the scan button is pushed to directly touch the sensor.

2. The portable data collector according to claim 1, wherein the bottom face of the shell body is arranged a first connection portion, corresponding to which the grip is arranged a second connection portion, and wherein the first connection portion and the second connection portion are inter-buckled together.

3. The portable data collector according to claim 2, wherein the first connection portion is a hook slot and the second connection portion is a wedge hook, and wherein the wedge hook is wedged into the hook slot.

4. The portable data collector according to claim 1, wherein the bottom face of the shell body is arranged a first positioning portion, corresponding to which the grip is arranged a second positioning portion, and wherein the first positioning portion is positioned in the second positioning portion.

5. The portable data collector according to claim 4, wherein the first positioning portion is a tenon and the second positioning portion is a buckle slot, and wherein the tenon is positioned in the buckle slot.

* * * * *